(12) United States Patent
Yagami

(10) Patent No.: US 11,193,651 B2
(45) Date of Patent: Dec. 7, 2021

(54) ILLUMINATION DEVICE INCLUDING LASER LIGHT SOURCE, MOLDED BODY WITH OBTUSELY INCLINED SIDE SURFACES, AND PHOSPHOR LAYER

(71) Applicant: SONY SEMICONDUCTOR SOLUTIONS CORPORATION, Kanagawa (JP)

(72) Inventor: Kojiro Yagami, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/491,763

(22) PCT Filed: Feb. 20, 2018

(86) PCT No.: PCT/JP2018/005851
§ 371 (c)(1),
(2) Date: Sep. 6, 2019

(87) PCT Pub. No.: WO2018/189998
PCT Pub. Date: Oct. 18, 2018

(65) Prior Publication Data
US 2020/0370728 A1    Nov. 26, 2020

(30) Foreign Application Priority Data
Apr. 14, 2017 (JP) .............................. JP2017-080281

(51) Int. Cl.
*F21V 9/32* (2018.01)
*G03B 21/20* (2006.01)

(52) U.S. Cl.
CPC .............. *F21V 9/32* (2018.02); *G03B 21/204* (2013.01)

(58) Field of Classification Search
CPC ... F21V 9/32; F21V 5/10; F21V 9/204; F21V 9/30; F21V 13/04; F21V 5/02;
(Continued)

(56) References Cited

U.S. PATENT DOCUMENTS

| 7,651,243 B2 * | 1/2010 | McGuire, Jr. ......... F21S 10/007 362/293 |
| 8,659,039 B2 * | 2/2014 | Wang ...................... H01L 33/24 257/95 |

(Continued)

FOREIGN PATENT DOCUMENTS

| CN | 102193296 A | 9/2011 |
| CN | 102419507 A | 4/2012 |

(Continued)

OTHER PUBLICATIONS

International Search Report and Written Opinion of PCT Application No. PCT/JP2018/005851, dated Apr. 10, 2018, 09 pages of ISRWO.

(Continued)

*Primary Examiner* — Ismael Negron
(74) *Attorney, Agent, or Firm* — Chip Law Group

(57) ABSTRACT

A fluorescent molded body includes a first surface that receives incident light from a laser light source, a second surface that faces the first surface, first and second lateral surfaces each contacting the second surface at a blunt angle, and a phosphor layer that is excited by light from the laser light source to emit a specific light. A distance between the position where the first and second lateral surfaces meet the second surface is less than two times the wavelength of the second light, such that evanescent waves generated at the first and second lateral surfaces by the second light, are coupled together to be converted into output light.

12 Claims, 11 Drawing Sheets

(58) Field of Classification Search
CPC .......... G03B 21/204; G02B 3/02; G02B 3/08; G02B 5/04; F21Y 2115/30
See application file for complete search history.

(56) References Cited

U.S. PATENT DOCUMENTS

| | | | | |
|---|---|---|---|---|
| 9,134,595 | B2* | 9/2015 | Ogura | .................. H01L 33/50 |
| 2007/0019408 | A1* | 1/2007 | McGuire, Jr. | .......... H04N 9/315 |
| | | | | 362/231 |
| 2010/0128462 | A1* | 5/2010 | Chern | ..................... F21V 9/38 |
| | | | | 362/84 |
| 2011/0228232 | A1 | 9/2011 | Sakata et al. | |
| 2011/0297955 | A1 | 12/2011 | Wang et al. | |
| 2012/0075591 | A1 | 3/2012 | Ogura et al. | |
| 2013/0083296 | A1* | 4/2013 | Ogura | .................. H01L 33/50 |
| | | | | 353/31 |
| 2014/0152964 | A1 | 6/2014 | Sakata et al. | |
| 2016/0061391 | A1 | 3/2016 | Inoue et al. | |

FOREIGN PATENT DOCUMENTS

| | | | | |
|---|---|---|---|---|
| CN | 104969370 | A | 10/2015 | |
| JP | 2009-059851 | A | 3/2009 | |
| JP | 2011-197212 | A | 10/2011 | |
| JP | 2012-038977 | A | 2/2012 | |
| JP | 2012-068465 | A | 4/2012 | |
| JP | 2013-219343 | A | 10/2013 | |
| JP | 2015-011796 | A | 1/2015 | |
| JP | 2015-195098 | A | 11/2015 | |
| KR | 10-1293401 | B1 | 8/2013 | |
| TW | 201221859 | A1 | 6/2012 | |
| WO | 2010/095531 | A1 | 8/2010 | |
| WO | 2010/95531 | A1 | 8/2010 | |
| WO | WO-2010095531 | A * | 8/2010 | ............. H01L 33/24 |
| WO | 2014/119783 | A1 | 8/2014 | |

OTHER PUBLICATIONS

Office Action for JP Patent Application No. 2019-512361, dated Jul. 27, 2021, 4 pages of Office Action and 3 pages of English Translation.

* cited by examiner

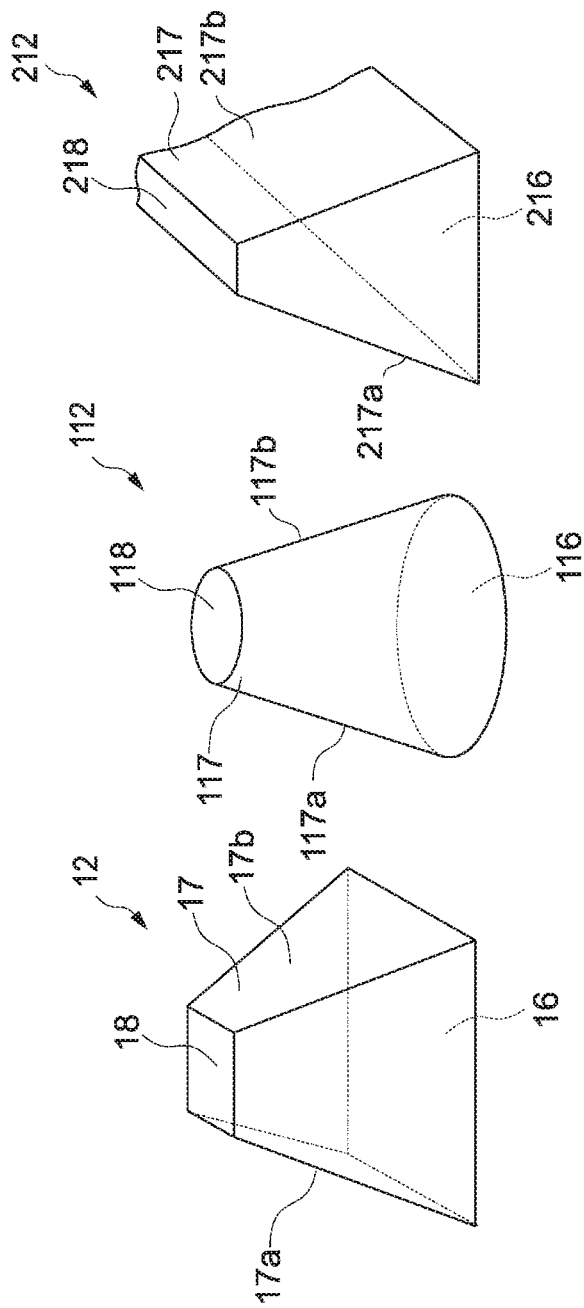

ILLUMINATION DEVICE INCLUDING LASER LIGHT SOURCE, MOLDED BODY WITH OBTUSELY INCLINED SIDE SURFACES, AND PHOSPHOR LAYER

CROSS REFERENCE TO RELATED APPLICATIONS

This application is a U.S. National Phase of International Patent Application No. PCT/JP2018/005851 filed on Feb. 20, 2018, which claims priority benefit of Japanese Patent Application No. JP 2017-080281 filed in the Japan Patent Office on Apr. 14, 2017. Each of the above-referenced applications is hereby incorporated herein by reference in its entirety.

TECHNICAL FIELD

The present technology relates to a fluorescent molded body, a solid light source, and an electronic apparatus using the same.

BACKGROUND ART

A light-emitting diode that makes use of the coupling phenomenon of evanescent light in a frustum structure has been proposed (see, for example, Patent Literature 1). The light-emitting diode has a configuration in which an active layer serving as a light-emitting diode is embedded in the frustum of a semiconductor such as GaAs.

CITATION LIST

Patent Literature

Patent Literature 1: Japanese Patent Application Laid-open No. 2013-219343

DISCLOSURE OF INVENTION

Technical Problem

The above light-emitting diode has low brightness and is required to be manufactured through a number of steps due to the configuration in which the active layer serving as a light-emitting diode is embedded in the frustum, which makes it difficult to manufacture a fine structure. Further, since a current is supplied to the frustum during the operation of the light-emitting diode, the light-emitting diode is required to be driven at low temperature to prevent its degradation due to heating. Therefore, the use application of the light-emitting diode is limited.

It is an object of the present technology to provide: a fluorescent molded body that does not require the supply of a current to a frustum and obtains high-brightness light emission having high directivity; a solid light source; and an electronic apparatus using the same.

Solution to Problem

A fluorescent molded body according to an embodiment of the present technology includes a first surface, a second surface, and a lateral surface.

Excitation light output from a laser light source is incident on the first surface.

The second surface is arranged facing the first surface.

The lateral surface is in contact with the first surface and the second surface and has a first inclined surface and a second inclined surface inclined at a blunt angle with respect to the second surface and arranged facing each other.

The fluorescent molded body emits light when excited by the excitation light. A distance between a position at which the first inclined surface and the second surface are in contact with each other and a position at which the second inclined surface and the second surface are in contact with each other is less than $2\lambda$ when a light emission wavelength of the emitted light is expressed as $\lambda$.

According to such configurations of the present embodiment, evanescent waves are generated at a first inclined surface and a second inclined surface when excitation light is applied to a fluorescent molded body and light emitted inside the fluorescent molded body is totally reflected at the interface between a phosphor and an outside. The generated evanescent waves move to a second surface along the inclined surfaces. Then, since the distance between a position at which the first inclined surface and the second surface are in contact with each other and a position at which the second inclined surface and the second surface are in contact with each other is set to be less than $2\lambda$, the evanescent waves moving along the inclined surfaces do not disappear but are coupled together on the side of the first surface to be converted into propagation light. Thus, high-brightness light emission having high directivity can be obtained from the fluorescent molded body.

Evanescent waves are generated at the first inclined surface and the second inclined surface when the light emitted due to the fluorescent molded body being excited by the excitation light is totally reflected inside the fluorescent molded body.

An angle formed between the first inclined surface and the second surface and an angle formed between the second inclined surface and the second surface may be equal to each other.

According to such configurations, evanescent waves moving along a first inclined surface and evanescent waves moving along a second inclined surface reach the vicinity of the center between a position at which the first inclined surface and a second surface are in contact with each other and a position at which the second inclined surface and the second surface are in contact with each other at the same timing and are coupled together. As a result, strong light emission can be obtained.

The first surface and the second surface may be arranged parallel to each other.

The second surface may be a flat surface.

Further, the first surface may be a flat surface, and both the first surface and the second surface may be flat surfaces.

The fluorescent molded body may have a frustum shape.

The fluorescent molded body may be made of a bulk phosphor.

Since a bulk phosphor having high excitation efficiency is used as a fluorescent molded body as described above, sufficient light emission can be obtained even if the intensity of laser light is weak. Further, the fluorescent molded body can be easily molded by processing a phosphor bulk plate made of a bulk crystal.

The fluorescent molded body may have a transparent high refractive index body and a phosphor layer that is arranged inside the transparent high refractive index body and contains phosphor fine particles that emit light when excited by the excitation light.

A solid light source according to an embodiment of the present technology includes a laser light source and a fluorescent molded body.

The laser light source outputs excitation light.

The fluorescent molded body has a first surface on which the excitation light is incident, a second surface arranged facing the first surface, and a lateral surface that is in contact with the first surface and the second surface and has a first inclined surface and a second inclined surface inclined at a blunt angle with respect to the second surface and arranged facing each other. The fluorescent molded body emits light when excited by the excitation light. A distance between a position at which the first inclined surface and the second surface are in contact with each other and a position at which the second inclined surface and the second surface are in contact with each other is less than 2λ when a light emission wavelength of the emitted light is expressed as λ.

According to the present embodiment, evanescent waves are generated at inclined surfaces when excitation light is applied to a fluorescent molded body. The evanescent waves move to a second surface along the inclined surfaces. Then, since the distance between a position at which a first inclined surface and the second surface are in contact with each other and a position at which a second inclined surface and the second surface are in contact with each other is set to be less than 2λ, the evanescent waves moving along the inclined surfaces do not disappear but are coupled together on the side of the second surface to be converted into propagation light. Thus, high-brightness light emission having high directivity can be obtained from the optical module.

An electronic apparatus according to an embodiment of the present technology includes a laser and a fluorescent molded body.

The laser light source outputs excitation light.

The fluorescent molded body has a first surface on which the excitation light is incident, a second surface arranged facing the first surface, and a lateral surface that is in contact with the first surface and the second surface and has a first inclined surface and a second inclined surface inclined at a blunt angle with respect to the second surface and arranged facing each other. The fluorescent molded body emits light when excited by the excitation light. A distance between a position at which the first inclined surface and the second surface are in contact with each other and a position at which the second inclined surface and the second surface are in contact with each other is less than 2λ when a light emission wavelength of the emitted light is expressed as λ.

According to the present embodiment, a solid light source including a laser light source and a fluorescent molded body can be mounted in an electronic apparatus such as a projector and an optical apparatus.

The electronic apparatus may further include a rotation substrate having a plurality of the fluorescent molded bodies arranged thereon and causing the excitation light to pass therethrough.

By the arrangement of a plurality of fluorescent molded bodies on a rotation substrate like this, excitation light can be applied to a fluorescent molded body while the application position of the excitation light from a laser light source is relatively moved. As a result, degradation due to local heating resulting from the excitation light can be prevented.

Advantageous Effects of Invention

As described above, high-brightness light emission having high directivity that makes use of the coupling phenomenon of evanescent light can be obtained according to the present technology.

Note that the effects described here are not limitative and any effect described in the present disclosure may be produced.

BRIEF DESCRIPTION OF DRAWINGS

FIGS. 3A, 3B, and 3C are perspective views of fluorescent molded bodies used in the solid light source according to the first to third embodiments.

MODE(S) FOR CARRYING OUT THE INVENTION

Hereinafter, embodiments according to the present technology will be described with reference to the drawings.

First Embodiment

Figure 1:
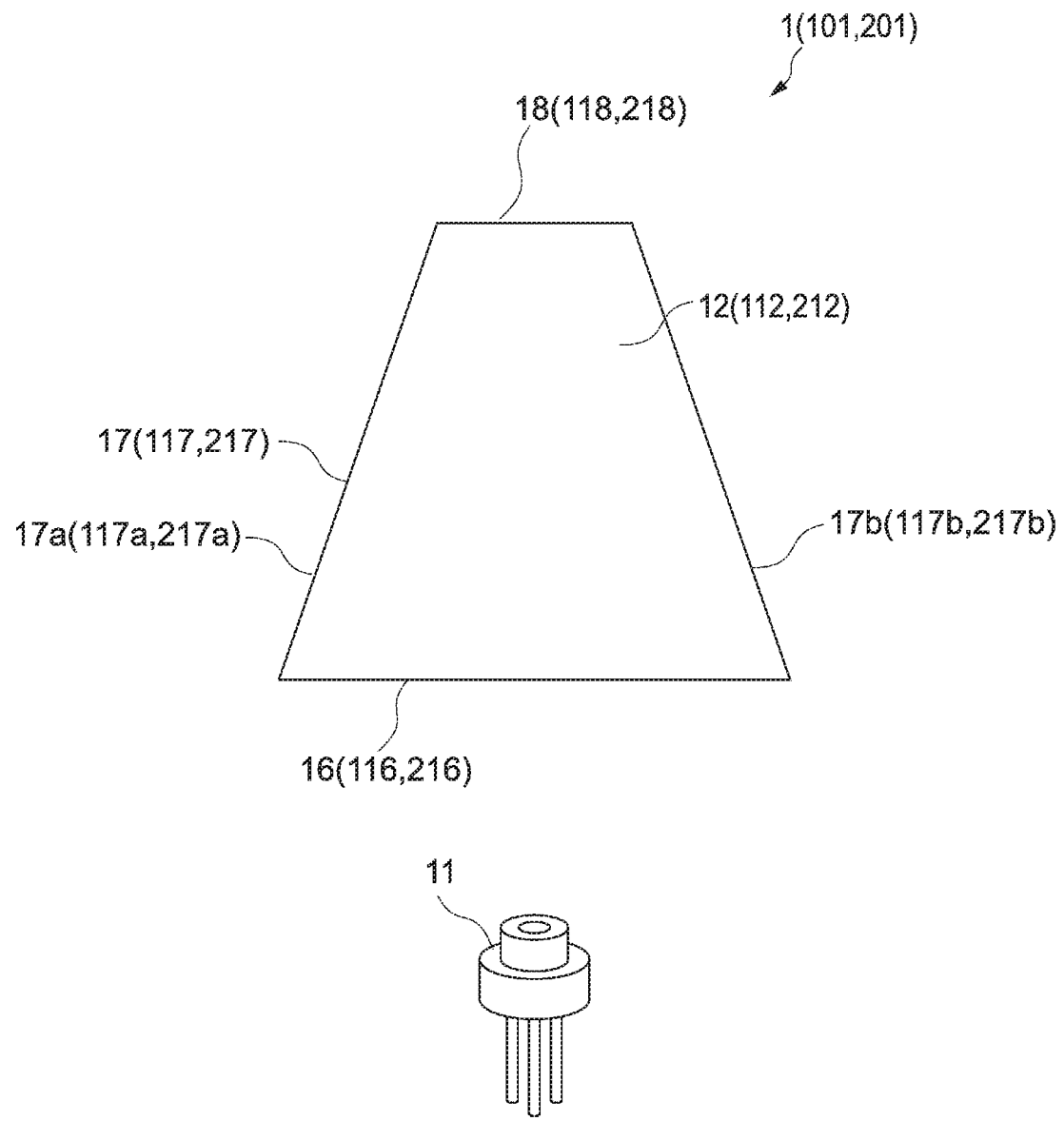
FIG. 1 is a schematic view of a solid light source according to first to third embodiments.
Figure 2:
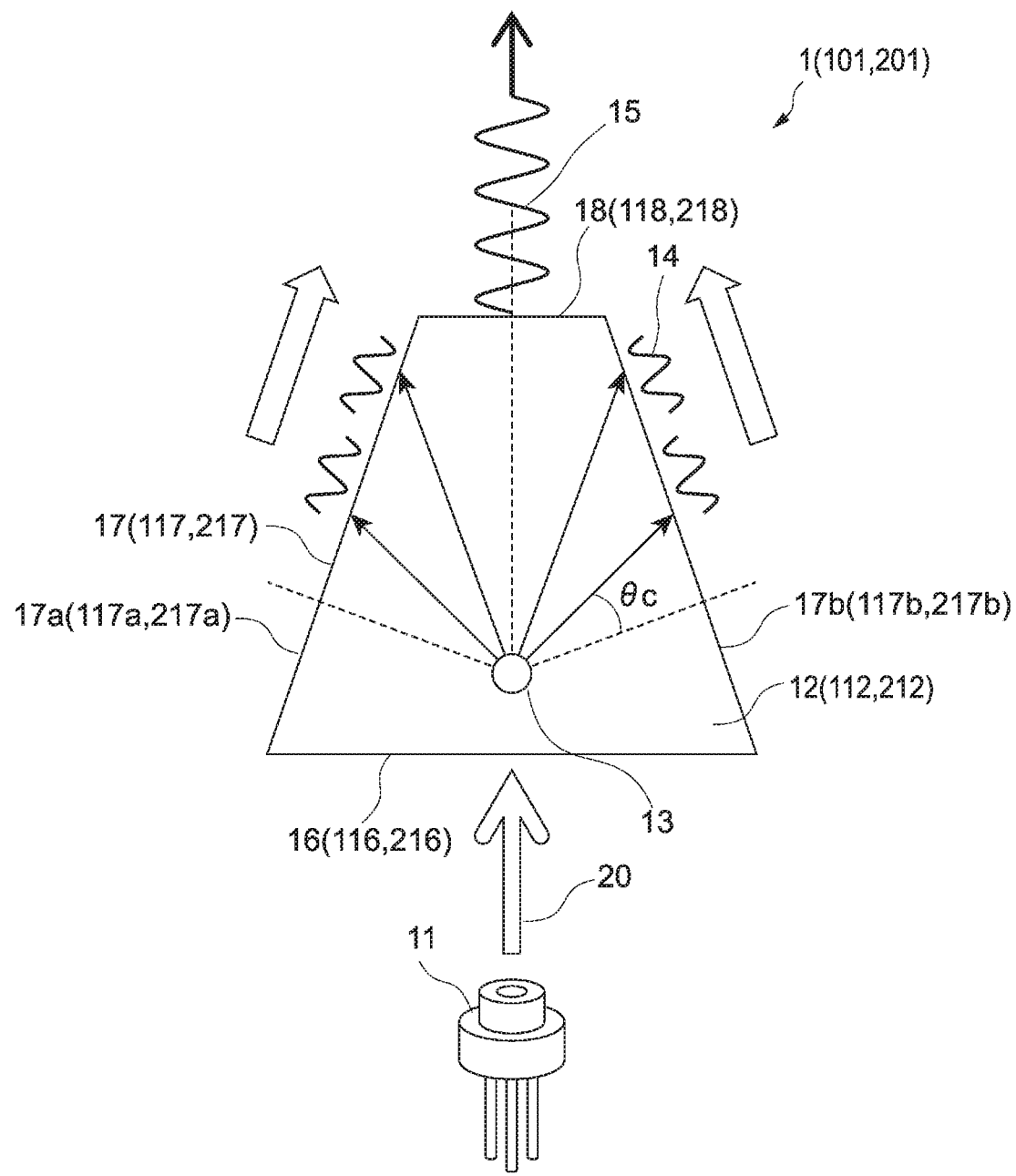
FIG. 2 is a view for describing the coupling phenomenon of evanescent light in the solid light source of FIG. 1.

FIG. 1 is a schematic view of a solid light source according to a first embodiment, and FIG. 2 is a view for describing the coupling phenomenon of evanescent light in the solid light source of FIG. 1. FIG. 3A is a perspective view of a fluorescent molded body constituting a part of the solid light source of FIG. 1.

A solid light source 1 has a laser light source 11 that is an excitation light source and a fluorescent molded body 12. The solid light source 1 may include one fluorescent molded body 12 or a plurality of fluorescent molded bodies 12 for the one laser light source 11.

The laser light source 11 outputs laser light 20 that is excitation light to the fluorescent molded body 12. The fluorescent molded body 12 emits light when excited by the laser light. In the present embodiment, an InGaN bluish violet laser is, for example, used as the laser light source 11.

The fluorescent molded body 12 can be, for example, a bulk phosphor made of a bulk crystal such as $BaMgAl_{10}O_{17}$:$Eu^{2+}$ (BAM) and $Sr_3MgSi_2O_8$:$Eu^{2+}$ (SMS) that is a blue phosphor. Here, the colon (:) in the composition of the phosphor stands for "activation" and indicates that the composition is activated by an element described following the colon.

The combination of laser light and a fluorescent molded body can be appropriately set depending on what color is emitted from a solid light source. The laser light source 11 can be one that is capable of emitting excitation light for exciting the fluorescent molded body 12 that is a phosphor to emit light. The laser light source 11 can be one that outputs the light of a wavelength range having energy higher than a wavelength range having the light emission peak of the fluorescent molded body 12. In the present embodiment, blue light is emitted from the solid light source 1.

The fluorescent molded body 12 has a truncated square pyramid shape having a first flat surface 16, a second flat surface 18, and a lateral surface 17.

The laser light 20 output from the laser light source 11 is incident on the first flat surface 16.

The first flat surface 16 and the second flat surface 18 are arranged parallel to each other. The second flat surface 18 has an area smaller than that of the first flat surface 16, and the first flat surface 16 is similar in shape to the second flat surface 18. Further, the second flat surface 18 is positioned inside the first flat surface 16 when projected onto the first flat surface 16.

The lateral surface 17 is a pyramid surface in contact with the first flat surface 16 and the second flat surface 18. The lateral surface 17 has a pair of a first inclined surface 17a and a second inclined surface 17b inclined at a blunt angle with respect to the second flat surface 18 and arranged facing each other. In the present embodiment, an angle formed between the second flat surface 18 and the first inclined surface 17a and an angle formed between the second flat surface 18 and the second inclined surface 17b are equal to each other. Since the fluorescent molded body 12 has a truncated square pyramid shape in the present embodiment, two sets of the first inclined surfaces 17a and the second inclined surfaces 17b arranged facing each other exist.

The fluorescent molded body 12 is formed by processing the surface of a phosphor bulk plate made of a bulk crystal into a desired shape.

Evanescent waves 14 are generated at the surfaces of the first inclined surface 17a and the second inclined surface 17b of the fluorescent molded body 12 when the laser light 20 is incident on the fluorescent molded body 12 and then light emitted due to the fluorescent molded body 12 being excited by the laser light 20 is totally reflected inside the fluorescent molded body 12. The evanescent waves 14 are special light oozing into a low refractive index medium side under all reflecting conditions.

The fluorescent molded body 12 has a symmetric surface that is a surface that passes through a symmetric axis along which the first flat surface 16 is divided into two to be line symmetrical and that is perpendicular to the first flat surface 16. The first inclined surface 17a and the second inclined surface 17b are symmetric with each other with the symmetric surface as a boundary. The first inclined surface 17a and the second inclined surface 17b are included in the lateral surface 17.

The evanescent waves 14 ooze into the pair of the first inclined surface 17a and the second inclined surface 17b and move toward the second flat surface 18 along the first inclined surface 17a and the second inclined surface 17b. When reaching the second flat surface 18, the evanescent waves 14 are coupled together to be converted into propagation light 15. The propagation light 15 is strong light having directivity and emitted from the solid light source 1. The second flat surface 18 is positioned on a positioning side on which the mutual extending surfaces of the pair of the first inclined surface 17a and the second inclined surface 17b contact each other when extended.

The fluorescent molded body 12 is desirably molded to make the distances between positions at which the light starts its total reflection at the inclined surfaces and the second flat surface 18 be almost the same between the side of the first inclined surface 17a and the side of the second inclined surface 17b so that the evanescent waves moving on the respective inclined surfaces of the first inclined surface 17a and the second inclined surface 17b are strongly coupled together.

In order to generate the evanescent waves 14, it is necessary for the laser light 20 incident on the fluorescent molded body 12 to be totally reflected inside the fluorescent molded body 12. Therefore, the fluorescent molded body 12 is designed so that an incident angle at which the light emitted from a light emission point 13 inside the fluorescent molded body 12 is incident on the boundary between the fluorescent molded body 12 and the air becomes larger than a critical angle at the total reflection. Here, the light emission point 13 is the focal point of the laser light source 11, and the laser light 20 from the laser light source 11 is condensed at the light emission point 13 by, for example, a condensing optical system not shown. The fluorescent molded body 12 is excited to emit the light when the laser light 20 is applied to the fluorescent molded body 20.

Figure 4A:
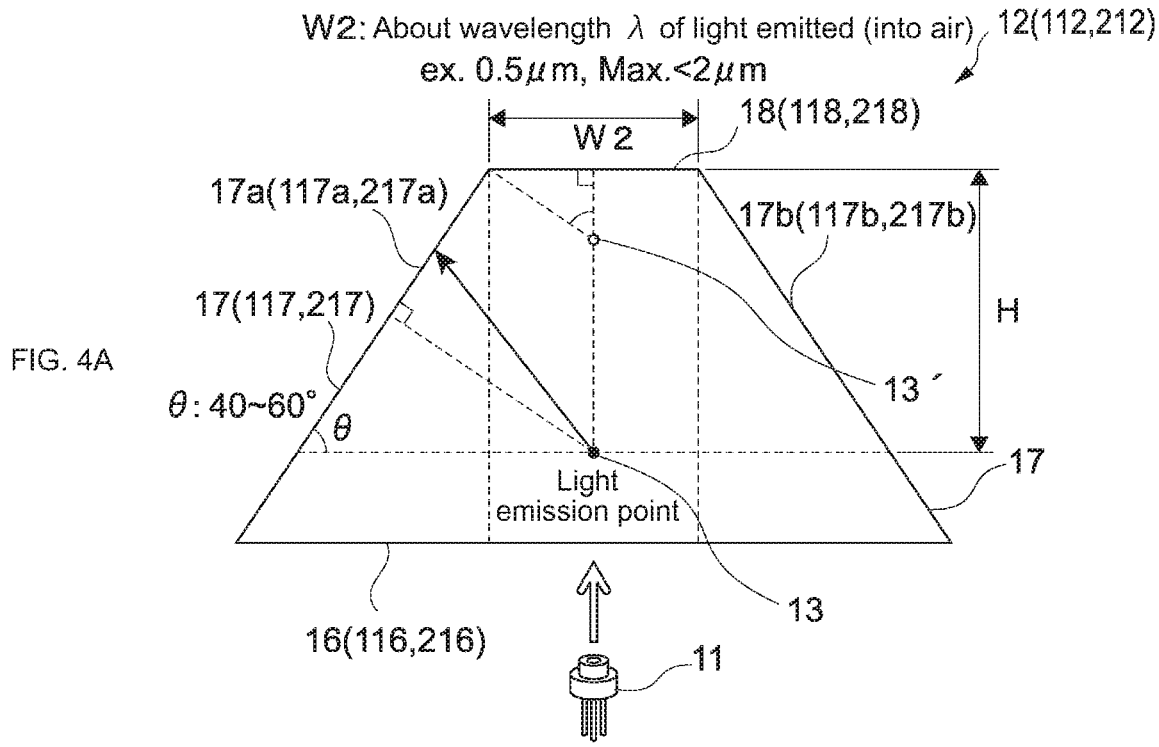
Fig. 4A and 4B are a cross-sectional view of a fluorescent molded body for describing the dimensions of the fluorescent molded body used in the solid light sources according to the respective embodiments and a cross-sectional view of a fluorescent molded body for describing the dimensions of the fluorescent molded body used in the solid light source according to the first embodiment, respectively.
Figure 4B:
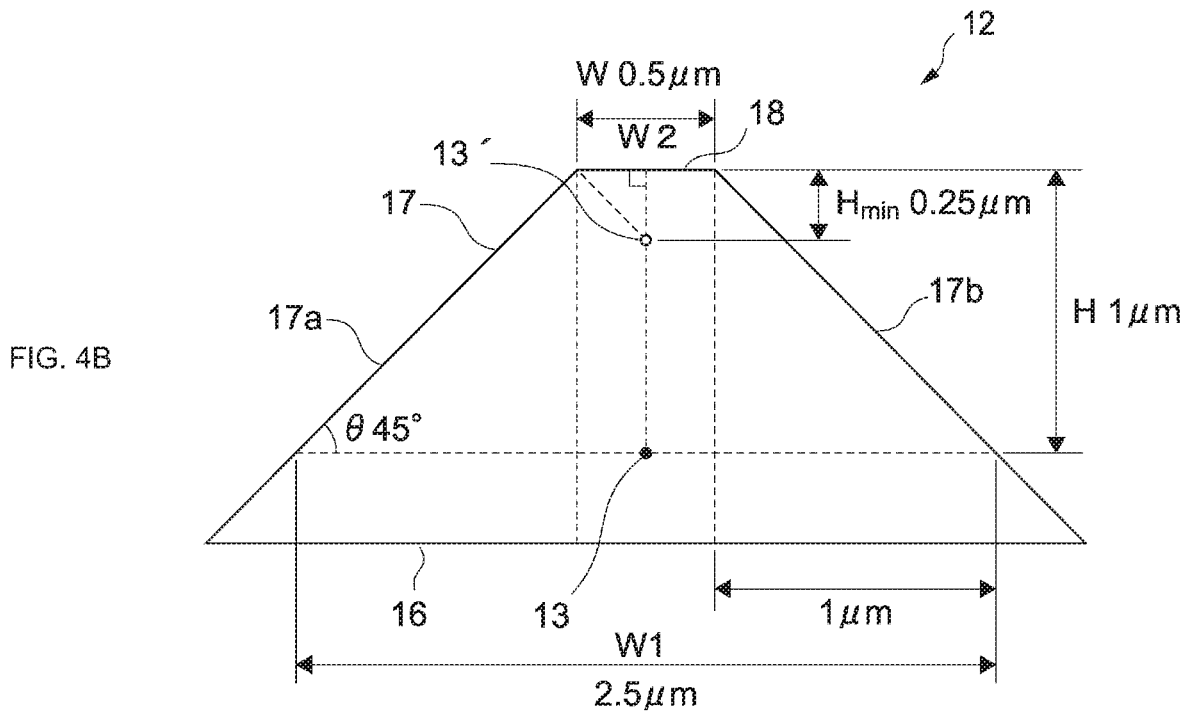

FIGS. 4A and 4B are cross-sectional views obtained when the fluorescent molded body 12 is cut off along a cross section perpendicular to a symmetric surface that passes through a symmetric axis along which the first flat surface 16 is divided into two to be line symmetrical and that is perpendicular to the first flat surface 16. The cross section has an isosceles trapezoid shape.

The angles and dimensions of the trapezoid of the cross section of the fluorescent molded body 1 are appropriately designed according to a light emission wavelength and the material properties of a bulk phosphor constituting the fluorescent molded body so that the evanescent waves are strongly coupled together.

As described above, it is necessary for the excited light to be totally reflected inside the fluorescent molded body 12 to generate the evanescent waves. Further, the evanescent waves disappear at a propagation distance of about a wavelength $\lambda$. Note that $\lambda$ expresses the light emission wavelength of the light emitted into the air from the fluorescent molded body 12 when the fluorescent molded body 12 is excited by the incidence of the laser light 20.

In consideration of the above circumstances, an angle $\theta$ formed between a surface passing through the light emission point 13 and parallel to the second flat surface 18 and each of the first inclined surface 17a and the second inclined surface 17b is desirably in the range of 40° to 60° in the fluorescent molded body 12 as shown in FIG. 4A so that the evanescent waves 14 are coupled together to be converted into the propagation light 15. Further, a width W2 of the second flat surface 18 corresponding to the upper base of the trapezoid is desirably less than $2\lambda$. The value of W2 can be, for example, less than 2 μm. Further, the depth position of the focal point of the laser, i.e., a distance H between the light emission point 13 and the second flat surface 18 is desirably 1 μm or less.

The above width W2 corresponds to the distance between a position at which the first inclined surface 17a and the second flat surface 18 are in contact with each other and a position at which the second inclined surface 17b and the second flat surface 18 are in contact with each other.

The distance H between the light emission point 13 and the second flat surface 18 is desirably 1 µm or less. If the distance H is larger than 1 µm, a distance at which the generated evanescent waves move become too long. As a result, the evanescent waves return to the inside of the fluorescent molded body 12 as reflection light and do not reach the second flat surface 18. On the other hand, if the value of the distance H is too small, the total reflection light cannot be efficiently used.

When a point at which a perpendicular line dropping from the light emission point 13 to the second flat surface 18 and the second flat surface 18 cross each other is positioned at the center of the second flat surface 18, a lower limit value $H_{min}$ of the distance H can be calculated by $(W/2)/\tan\theta$. For example, the distance H is set at 0.25 µm to 1 µm. In FIGS. 4A and 4B, reference sign 13' indicates the position of the light emission point when the distance H is set at the lower limit value $H_{min}$.

The light emission point 13 is desirably positioned inside the second flat surface 18 and further desirably positioned at the center of the second flat surface 18 when projected onto the second flat surface 18. Thus, the directivity of the emitted light is improved. For example, the directivity of the emitted light is reduced when the light emission point 13 deviates from the center of the second flat surface 18.

Further, the incidence of the laser light 20 to the fluorescent molded body 12 is desirably perpendicularly performed with respect to the first flat surface 16 to prevent the loss of the light due to its reflection.

FIG. 4B shows the specific dimensions of the fluorescent molded body 12 according to the present embodiment.

As shown in FIG. 4B, the angle θ formed between the surface parallel to the second flat surface 18 and passing through the light emission point 13 and each of the first inclined surface 17a and the second inclined surface 17b is set at 45°, a width W1 of the surface parallel to the first flat surface 16 and passing through the light emission point 13 is set at 2.5 µm, the width W2 of the second flat surface 18 is set at 0.5 µm, and the distance H between the surface parallel to the first flat surface 16 and passing through the light emission point 13 and the second flat surface 18 is set at 1 µm.

The width W1 corresponds to the length of a line at which surfaces perpendicular to the symmetric surface and the first flat surface 16 of the fluorescent molded body 12 of the truncated square pyramid and the surface parallel to the first flat surface 16 and passing through the light emission point 13 cross each other.

The width W2 corresponds to the length of a line at which surfaces perpendicular to the symmetric surface and the second flat surface 18 of the fluorescent molded body 12 of the truncated square pyramid and the second flat surface 18 cross each other.

As described above, by making use of the coupling phenomenon of the evanescent light, the emission of the light that provides high light extraction efficiency, high brightness, and high directivity can be obtained in the present embodiment. Further, there is no need to supply a current to the fluorescent molded body. Therefore, the occurrence of the degradation of the fluorescent molded body due to overheat resulting from the supply of a current can be prevented, the operation of the fluorescent molded body at room temperature is allowed, and the use application of the fluorescent molded body is wide.

Further, the fluorescent molded body 12 is formed by processing a phosphor bulk plate made of a bulk crystal. Therefore, there is no need to form, through a plurality of manufacturing steps, a frustum in which a light-emitting diode is arranged. As a result, the fluorescent molded body 12 can be easily manufactured. Further, the phosphor is caused to emit the light by the excitation light from the laser light rather than a light-emitting diode. Therefore, the fluorescent molded body 12 can emit the high brightness light.

Further, the bulk phosphor has high excitation efficiency. Therefore, even if the light emission efficiency is high and the intensity of the laser light is weak, sufficient light emission can be obtained. Further, the bulk phosphor can have a large volume. Therefore, the fluorescent molded body 12 is free from the influence of a reduction in quantum efficiency due to defective surface processing.

In the solid light source 1, the fluorescent molded body 12 and the laser light source 11 are, for example, assumed as one unit. The solid light source is used with a plurality of units of the fluorescent molded bodies 12 and the laser light sources 11 arranged in a matrix shape.

In the present embodiment, the fluorescent molded body has a truncated square pyramid shape, but the shape of the fluorescent molded body is not limited to the shape. For example, the fluorescent molded body may have a truncated cone shape as described in the following second embodiment or a shape linearly extending in one direction as described in the following third embodiment.

The fluorescent molded body only has to have at least a first surface and a second surface facing each other and a lateral surface and have a shape in which the lateral surface has a first inclined surface and a second inclined surface inclined at a blunt angle with respect to the second surface and arranged facing each other. In other words, when the fluorescent molded body is cut off along a surface orthogonal to the second surface with the first surface oriented downward, the cross section only has to have a substantially square shape in which an angle formed between an upper side corresponding to the second surface and each of right and left sides corresponding to the inclined surfaces becomes a blunt angle and have a shape in which light emitted from a light emission point totally is reflected inside the fluorescent molded body. Thus, the evanescent waves are generated at the inclined surfaces.

Further, the distance between the light emission point and the second surface only has to be set so that the evanescent waves oozing into the inclined surfaces can reach the second surface, and the width W2 corresponding to the distance between a position at which the first inclined surface and the second surface are in contact with each other and a position at which the second inclined surface and the second surface are in contact with each other, only has to be less than 2λ so that the evanescent waves are coupled together to be converted into propagation light.

Specifically, for example, when the first surface and the second surface are parallel to each other, an angle θ formed between a surface passing through the light emission point 13 and parallel to the second surface and the inclined surfaces only has to be set at 40° to 60° and the width W2 of the second surface only has to be less than 2λ as shown in FIG. 4A in the trapezoidal cross section of the fluorescent molded body cut off along a cross section perpendicular to both a symmetric surface that passes through a symmetric axis along which the second surface is divided into two to be line symmetrical and that is perpendicular to the second surface and a second flat surface. Moreover, the distance between the second surface and the light emission point only has to be set at 0.25 µm or more and 1 µm or less so that the generated evanescent waves can reach the second surface.

Note that the present embodiment describes a case in which the cross section of the fluorescent molded body has an isosceles trapezoid shape, but the shape of the fluorescent molded body is not limited to the shape. In a trapezoidal cross section, both of two internal angles at both ends of an upper base corresponding to the second flat surface only have to be blunt angles. The evanescent waves are generated at inclined surfaces even if the internal angles are not the same.

However, the angle formed between the second flat surface and the first inclined surface is desirably equal to an angle formed between the second flat surface and the second inclined surface. Thus, the evanescent waves moving along the first inclined surface and the evanescent waves moving along the second inclined surface reach the vicinity of the center between a position at which the first inclined surface and the second surface are in contact with each other and a position at which the second inclined surface and the second surface are in contact with each other at the same timing and are coupled together. As a result, strong light emission and directivity can be obtained.

Hereinafter, the second embodiment and the third embodiment will be described but are different only in the shapes of their fluorescent molded bodies compared with the first embodiment. The same configurations as those of the above embodiment will be denoted by the same reference signs, and their descriptions will be omitted.

Second Embodiment

FIG. 1 is the schematic view of the solid light source according to the first embodiment. FIG. 2 is the view for describing the coupling phenomenon of the evanescent light in the solid light source of FIG. 1. FIG. 3B is a perspective view of a fluorescent molded body 112 constituting a part of a solid light source 101 of FIG. 1.

The solid light source 101 has a laser light source 11 that is an excitation light source and a fluorescent molded body 112 having a truncated cone shape.

The fluorescent molded body 112 has a truncated cone shape having a first flat surface 116, a second flat surface 118, and a lateral surface 117.

Laser light 20 that is excitation light output from the laser light source 11 is incident on the first flat surface 116.

The first flat surface 116 and the second flat surface 118 are arranged parallel to each other. The second flat surface 118 has an area smaller than that of the first flat surface 116, and the first flat surface 116 is similar in shape to the second flat surface 118. Further, the second flat surface 18 is positioned inside the first flat surface 16 when projected onto the first flat surface 16.

The lateral surface 117 is a cone surface in contact with the first flat surface 116 and the second flat surface 118. The lateral surface 117 has a first inclined surface 117a and a second inclined surface 117b inclined at a blunt angle with respect to the second flat surface 118 and arranged facing each other. In the present embodiment, the fluorescent molded body 112 has a truncated cone shape. Therefore, a pair of the first inclined surface 117a and the second inclined surface 117b arranged facing each other exists over a circumference.

The fluorescent molded body 112 has a symmetric surface that is a surface that passes through a symmetric axis along which the second flat surface 118 is divided into two to be line symmetrical and that is perpendicular to the second flat surface 118. The first inclined surface 117a and the second inclined surface 117b are symmetric with each other with the symmetric surface as a boundary.

In the present embodiment as well, evanescent waves 14 respectively ooze into the paired first inclined surface 117a and second inclined surface 117b, are coupled together at the second flat surface 118 to be propagation light 15, and are emitted from the solid light source 101 like the first embodiment.

Third Embodiment

FIG. 1 is the schematic view of the solid light source according to the first embodiment. FIG. 2 is the view for describing the coupling phenomenon of the evanescent light in the solid light source of FIG. 1. FIG. 3C is a partial perspective view of a fluorescent molded body 212 constituting a part of a solid light source 201 of FIG. 1.

The solid light source 201 has a laser light source 11 that is an excitation light source and a fluorescent molded body 212 which extends in one direction and of which the cross section has an isosceles trapezoid shape. Like this, the fluorescent molded body 212 having a linear shape may be disposed instead of a plurality of the fluorescent molded bodies 12 of the first embodiment or the fluorescent molded bodies 112 of the second embodiment disposed in one direction, whereby processing molding is facilitated.

The fluorescent molded body 212 has a hexahedron shape having a first flat surface 216, a second flat surface 218, and a lateral surface 217 and long in one direction.

Laser light 20 that is excitation light output from the laser light source 11 is incident on the first flat surface 216. The first flat surface 216 and the second flat surface 218 are arranged parallel to each other. A cross section obtained when the fluorescent molded body 212 is cut off along a surface perpendicular to the first flat surface 16 and orthogonal in the longitudinal direction of the fluorescent molded body 212 has an isosceles trapezoid shape.

The lateral surface 217 is in contact with the first flat surface 216 and the second flat surface 218. The lateral surface 217 has a pair of a first inclined surface 217a and a second inclined surface 217b inclined at a blunt angle with respect to the second flat surface 218 and arranged facing each other. In the present embodiment, a set of the first inclined surface 17a and the second incline surface 17b arranged facing each other exists.

The fluorescent molded body 212 has a symmetric surface that is a surface that passes through a symmetric axis along which the second flat surface 218 is divided into two to be line symmetrical and that is perpendicular to the second flat surface 218. The first inclined surface 217a and the second inclined surface 217b are symmetric with each other with the symmetric surface as a boundary. In the present embodiment, the symmetric axis along which the second flat surface 218 is divided into two to be line symmetrical is parallel to the longitudinal direction of the fluorescent molded body 212.

Evanescent waves 14 respectively ooze into the paired first inclined surface 217a and second inclined surface 217b, are coupled together at the second flat surface 218 to be propagation light 15, and are emitted from the solid light source 201.

Fourth Embodiment

A solid light source according to the present technology can be applied to the light source of a projector, an in-vehicle head lamp, the light source of an optical apparatus, the backlight of a liquid crystal panel, or the like. In the present embodiment, an example in which a solid light source is mounted in a projector serving as an electronic apparatus will be described. The same configurations as those of the above embodiments will be denoted by the same reference signs.

Figure 5:
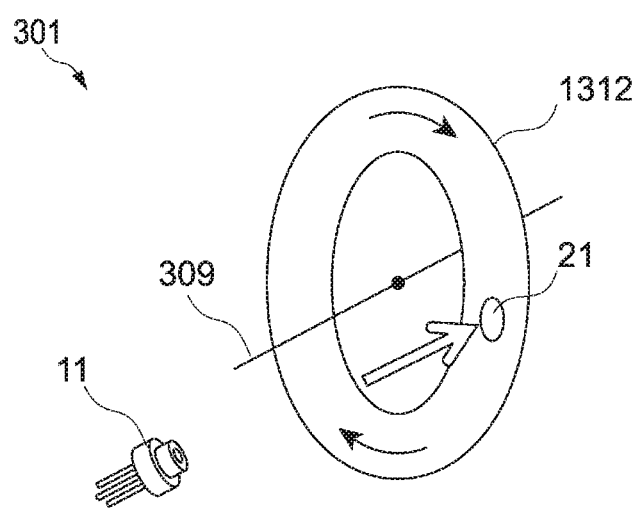
FIG. 5 is a schematic perspective view of a solid light source according to a fourth embodiment.
Figure 6:
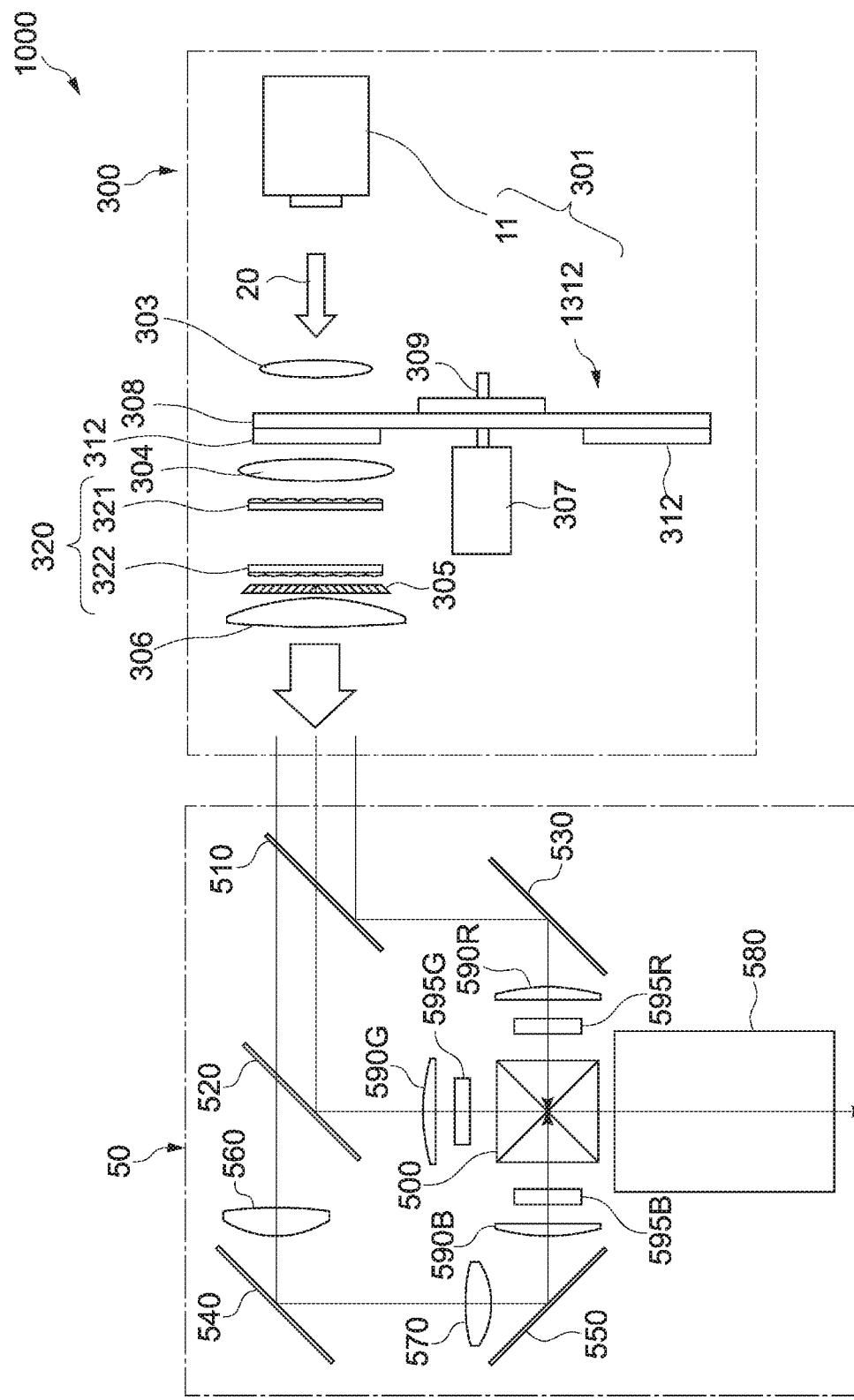
FIG. 6 is a schematic view showing the configurations of a projector in which the solid light source shown in FIG. 5 is mounted.

FIG. 5 is a schematic view of a solid light source 301 mounted in a projector. FIG. 6 is a schematic view showing the configurations of a projector 1000 in which the solid light source 301 shown in FIG. 5 is mounted.

As shown in FIG. 6, the projector 1000 has a light source unit 300 and an optical engine 50. The optical engine 50 uses light emitted from the light source unit 300. The projector 1000 applies light synthesized by a projection optical system 580 included in the optical engine 50 that will be described later to a screen.

The optical engine 50 includes dichroic mirrors 510 and 520, mirrors 530, 540, and 550, relay lenses 560 and 570, field lenses 590R, 590G, and 590B, liquid crystal light valves 595R, 595G, and 595B, a dichroic prism 500, and the projection optical system 580.

The light source unit 300 includes the solid light source 301, a condensing lens 303, a collimation optical system 304, an integrator element 320, a polarization conversion element 305, a superimposing lens 306, or the like. The light source unit 300 is a light source unit for a projector that emits white light.

The solid light source 301 has a laser light source 11 and a phosphor wheel 1312. As shown in FIGS. 5 and 6, the phosphor wheel 1312 has a disc-shaped rotation substrate 308 that causes laser light 20 output from the laser light source 11 to pass therethrough and a phosphor layer 312 provided on the rotation substrate 308. The phosphor layer 312 is a phosphor group in which a plurality of the fluorescent molded bodies 12 described in the above first embodiment is arrayed in a two-dimensional matrix shape. Note that the shape of the fluorescent molded bodies is not limited to a truncated square pyramid shape.

In the present embodiment, a purple laser having a wavelength of 405 nm is, for example, used as the laser light source 11. As the fluorescent molded bodies constituting the phosphor layer 312, two types of blue fluorescent molded bodies made of blue bulk phosphors and yellow fluorescent molded bodies made of yellow bulk phosphors are used. The blue bulk phosphors can be, for example, phosphors that are caused to emit blue light by excitation light having a wavelength of 405 nm such as $(SrBa)_{10}(PO_4)_6Cl_2$:Eu. The yellow bulk phosphors can be, for example, phosphors that are caused to emit yellow light by excitation light having a wavelength of 405 nm such as Ca-α-SiAlON:Eu. Pseudo white is generated by the blue and the yellow, and white light is emitted from the solid light source 301. The blue fluorescent molded bodies made of the blue bulk phosphors and the yellow fluorescent molded bodies made of the yellow bulk fluorescent molded bodies are arrayed in a checkered shape and a two-dimensional matrix shape on the rotation substrate 308 to constitute the phosphor layer 312.

The phosphor wheel 1312 is arranged with a principal surface on a side on which the phosphor layer 312 is not provided among the two principal surfaces of the rotation substrate 308 directed to the side of the condensing lens 303. A motor 307 that drives the phosphor wheel 1312 is connected to the center of the rotation substrate 308. The phosphor wheel 1312 has a rotation shaft 309 along a normal line passing through the center of the rotation substrate 308 and is provided to be rotatable about the rotation shaft 309 by the driving of the motor 307. Further, the phosphor wheel 1312 is arranged so that a focal position 21 of the laser light 20 condensed by the condensing lens 303 agrees with the position of the phosphor layer 312.

As the rotation substrate 308 is rotated by the motor 307, the laser light source 11 applies the laser light 20 that is excitation light to the phosphor layer 312 while relatively moving an applied position on the phosphor layer 312. Accordingly, the phosphor wheel 1312 obtains white light, while avoiding its degradation caused when the laser light is applied to the phosphor wheel 1312 at the same position for a long time and locally heated.

Further, in the present embodiment, the positions of the fluorescent molded bodies are made variable. However, the laser light emitted from the laser light source may be caused to perform a scan with the positions of the fluorescent molded bodies fixed to prevent local heating. Further, the fluorescent molded bodies arranged on the phosphor wheel 1312 may be a plurality of fluorescent molded bodies having a trapezoid cross section and a ring outer shape that are arrayed in a concentric circle shape.

Fifth Embodiment

Figure 7:
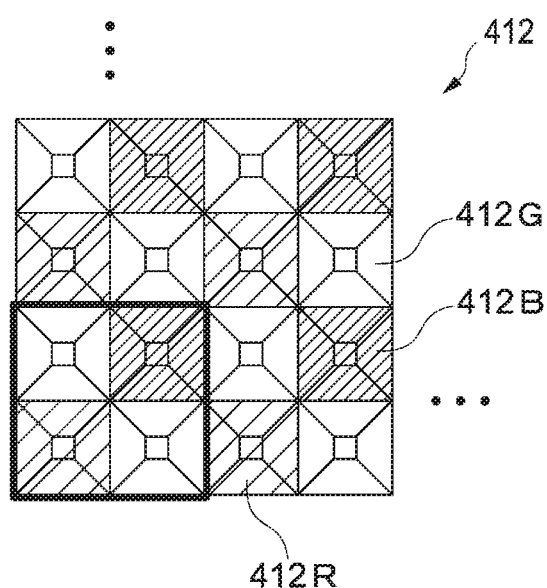
FIG. 7 is a plan view of a fluorescent molded body according to a fifth embodiment.

FIG. 7 is a view for describing the plan shape of a fluorescent molded body 412 of a solid light source according to a fifth embodiment. The fluorescent molded body 412 of the present embodiment has red fluorescent molded bodies caused to emit red, green fluorescent molded bodies caused to emit green, and blue fluorescent molded bodies caused to emit blue by laser light that is excitation light from a laser light source, and can obtain white by the red, the green, and the blue emitted from the fluorescent molded bodies of the respective colors.

As shown in FIG. 7, the fluorescent molded body 412 includes red fluorescent molded bodies 412R made of red bulk phosphors, green fluorescent molded bodies 412G made of green bulk phosphors, and blue fluorescent molded bodies 412B made of blue bulk phosphors arrayed in a two-dimensional matrix shape.

The red fluorescent molded bodies 412R, the green fluorescent molded bodies 412G, and the blue fluorescent molded bodies 412B constituting the fluorescent molded body 412 have a truncated square pyramid shape like, for example, the fluorescent molded body 12 described in the above first embodiment. Note that the shape of the fluorescent molded bodies is not limited to a truncated square pyramid shape.

The laser light source can be a laser that outputs excitation light that excites the red fluorescent molded bodies 412R, the green fluorescent molded bodies 412G, and the blue fluorescent molded bodies 412B. For example, the laser light source can be a purple laser having a wavelength of 405 nm. The red fluorescent molded bodies 412R can be, for example, Ca-α-SiAlSiN$_3$:Eu, the green fluorescent molded bodies 412G can be, for example, β-SiAlON:Eu, and the blue fluorescent molded bodies 412B can be, for example, $(SrBa)_{10}(PO_4)_6Cl_2$:Eu. These fluorescent molded bodies are caused to emit the red, the green, and the blue, respectively, by excitation light having a wavelength of 405 nm.

The laser light source may be separately provided for each of the fluorescent molded bodies, or one laser light may be collectively applied to the plurality of fluorescent molded bodies.

As described above, using a plurality of the fluorescent molded bodies different in the wavelength characteristics of the light emitted, the colors of the light obtained from the fluorescent molded bodies can be mixed together to obtain light having any color and chromaticity. Further, in order to emit the light of a desired color from the solid light source, the number of the arranged fluorescent molded bodies of the respective colors can be adjusted. For example, the number of the arranged red fluorescent molded bodies can be larger than those of the arranged fluorescent molded bodies of the other colors to obtain white light having strong red chromaticity.

Sixth Embodiment

The above embodiments mainly describe a configuration in which the one laser light is arranged with respect to the one fluorescent molded body 12. However, other configurations may be employed.

Figures 8A, 8B:
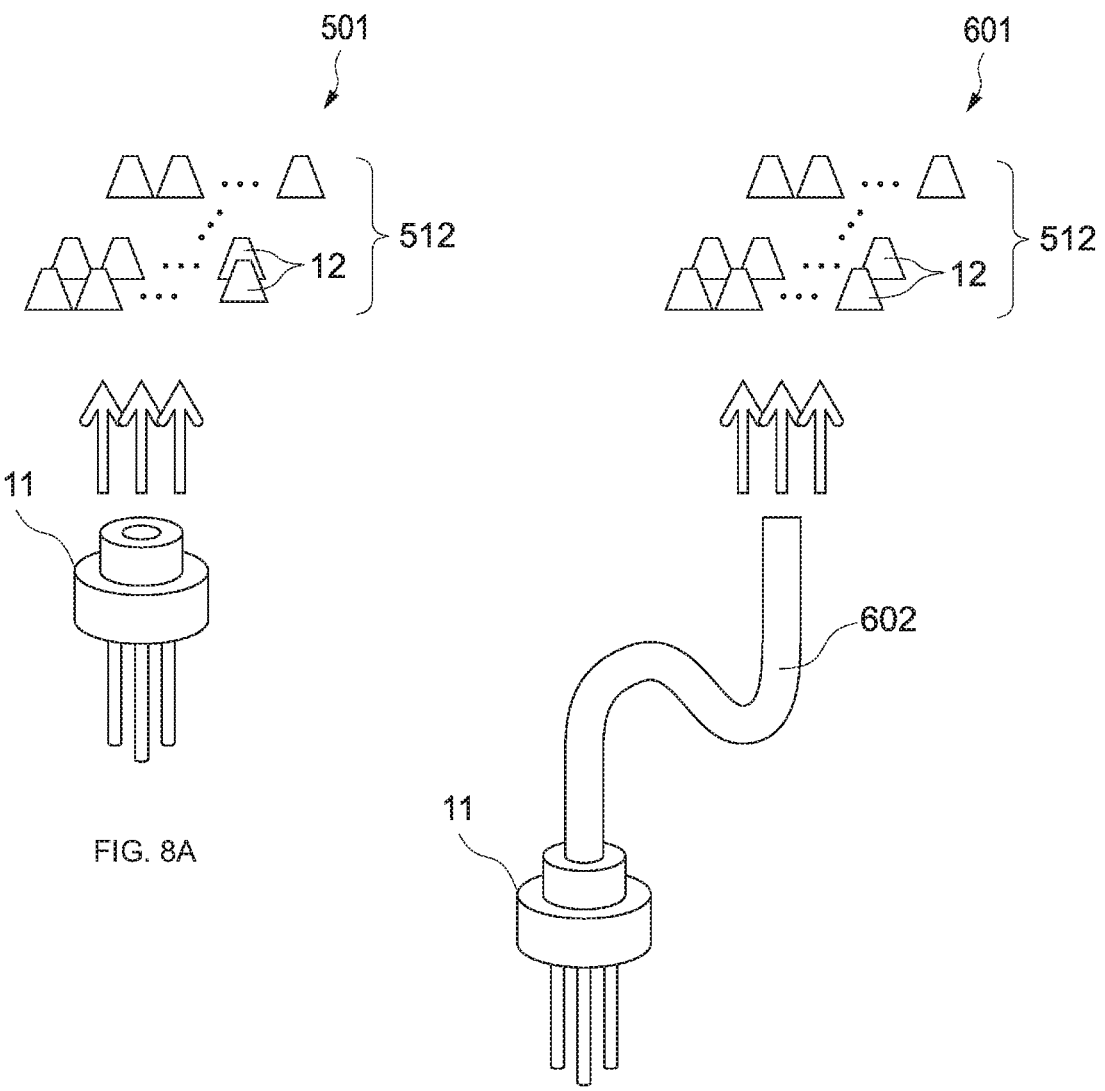
FIGS. 8A and 8B are a schematic view showing the configurations of a solid light source according to a sixth embodiment and a schematic view showing the configurations of a solid light source according to a seventh embodiment, respectively.

FIG. 8A is a schematic view of a solid light source 501 according to a sixth embodiment. As shown in FIG. 8A, one laser light source 11 may collectively apply excitation light to a plurality of fluorescent molded bodies 12. Further, the position of the laser light source 11 may be made variable, and the laser light source 11 may apply the excitation light to the plurality of fluorescent molded bodies 12 while performing a scan.

The plurality of fluorescent molded bodies 12 is arranged in a two-dimensional matrix shape so that first flat surfaces 16 of the respective fluorescent molded bodies 12 are flush with each other. The plurality of fluorescent molded bodies 12 is coupled together on the side of the first flat surfaces 16 to constitute a fluorescent molded body plate 512. The fluorescent molded body plate 512 can be formed by processing the surface of a phosphor bulk plate made of a bulk crystal. Further, the respective fluorescent molded bodies 12 are not coupled together but may be separately molded and arrayed in a two-dimensional matrix shape.

Note that an example in which the fluorescent molded bodies 12 having a truncated square pyramid shape are provided is described here, but the shape of the fluorescent molded bodies 12 is not limited to the truncated square pyramid shape. For example, the fluorescent molded bodies 12 may have a truncated cone shape like the above fluorescent molded body 112, or have a linear shape extending in one direction like the fluorescent molded body 212.

Seventh Embodiment

FIG. 8B is a schematic view of a solid light source 601 according to a seventh embodiment. The present embodiment is different only in the presence or absence of an optical fiber in terms of a configuration in comparison with the sixth embodiment. The same configurations as those of the sixth embodiment will be denoted by the same reference signs.

As shown in FIG. 8B, laser light 20 that is excitation light output from a laser light source 11 may be applied to a fluorescent molded body plate 512 via an optical fiber 602. Thus, an application range can be adjusted by the modulation of a beam diameter of the laser light 20, or the like. Further, the beam shape of the laser light 20 may be appropriately adjusted to a circle, a rectangle, or the like in consideration of an application area, application efficiency, heating prevention, or the like.

Further, even if laser light output from a laser light source is hardly incident on a fluorescent molded body in terms of design when a solid light source is mounted in an electronic apparatus or the like, the provision of the optical fiber 602 can increase a degree of flexibility in the arrangement of the laser light source 11 and widen the design range of an electronic apparatus.

Eighth Embodiment

Figure 9A:
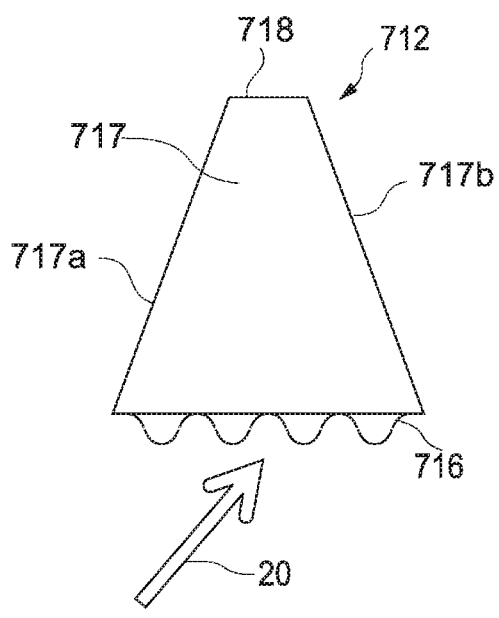
FIGS. 9A and 9B are a schematic side view of a fluorescent molded body according to an eighth embodiment and a schematic side view of a fluorescent molded body according to a ninth embodiment, respectively.

FIG. 9A is a schematic view of a fluorescent molded body of a solid light source according to an eighth embodiment. As shown in FIG. 9A, the side of a first surface 716 of a fluorescent molded body 712 on which laser light that is excitation light from a laser light source is incident may be processed into a moth eye shape. Alternatively, a moth eye shaped sheet may be arranged on the first flat surface 16 of the fluorescent molded body 12.

The fluorescent molded body 712 has a substantially truncated square pyramid shape having the first surface 716, a second flat surface 718, and a lateral surface 717. Laser light 20 output from a laser light source 11 is incident on the first surface 716. On the first surface 716 having a moth eye shape, a plurality of the same protrusions having a minute shape is evenly arranged. The center in the height direction of the plurality of protrusions is positioned on the same surface parallel to the second flat surface 718, and the first surface 716 and the second flat surface 718 are assumed to be arranged parallel to each other.

The lateral surface 717 is a pyramid surface in contact with the first surface 716 and the second flat surface 718. The lateral surface 717 has a pair of a first inclined surface 717a and a second inclined surface 717b inclined at a blunt angle with respect to the second surface 718 and arranged facing each other.

As described above, the first surface 716 can have an anti-reflection structure and reduce the loss of the light caused when the obliquely-incident laser light 20 is reflected by the first surface 716. As a result, the efficiency of taking the laser light (excitation light) is improved.

Ninth Embodiment

Figure 9B:
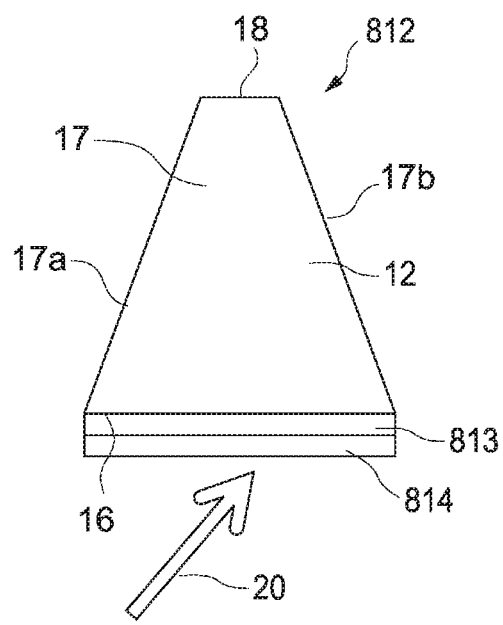

FIG. 9B is a schematic view of a fluorescent molded body of a solid light source according to a ninth embodiment. As shown in FIG. 9B, a fluorescent molded object 812 has a fluorescent molded body 12 and a first optical film 813 and a second optical film 814 sequentially laminated on a first flat surface 16 of the fluorescent molded body 12.

When the refractive index of the fluorescent molded body 12 is n1, the refractive index of the first optical film 813 is n2, the refractive index of the second optical film 814 is n3, and the refractive index of the air is n4, the fluorescent molded object 812 is configured so that the relationship n1>n2>n3>n4 is established. As a result, the fluorescent molded object 812 can have an anti-reflection structure. Besides the anti-reflection structure formed by a multilayer film structure in which the refractive index increases stepwise from the air to the fluorescent molded body as described above, the anti-reflection structure may be formed by an optical film in which a refractive index sequentially changes on the first flat surface 16 of the fluorescent molded body. Thus, the loss of light caused when obliquely-incident laser light 20 is reflected by a first surface can be reduced. As a result, the efficiency of taking the laser light (excitation light) is improved.

Tenth Embodiment

The above respective embodiments describe examples in which the bulk phosphors are used as the fluorescent molded bodies. However, as a fluorescent molded body, a phosphor fine particle compound may be arranged inside a high refractive index body having a transparent frustum shape. Hereinafter, a fluorescent molded body will be described with reference to FIG. 10. The same configurations as those of the above embodiments will be denoted by the same reference signs.

Figure 10:
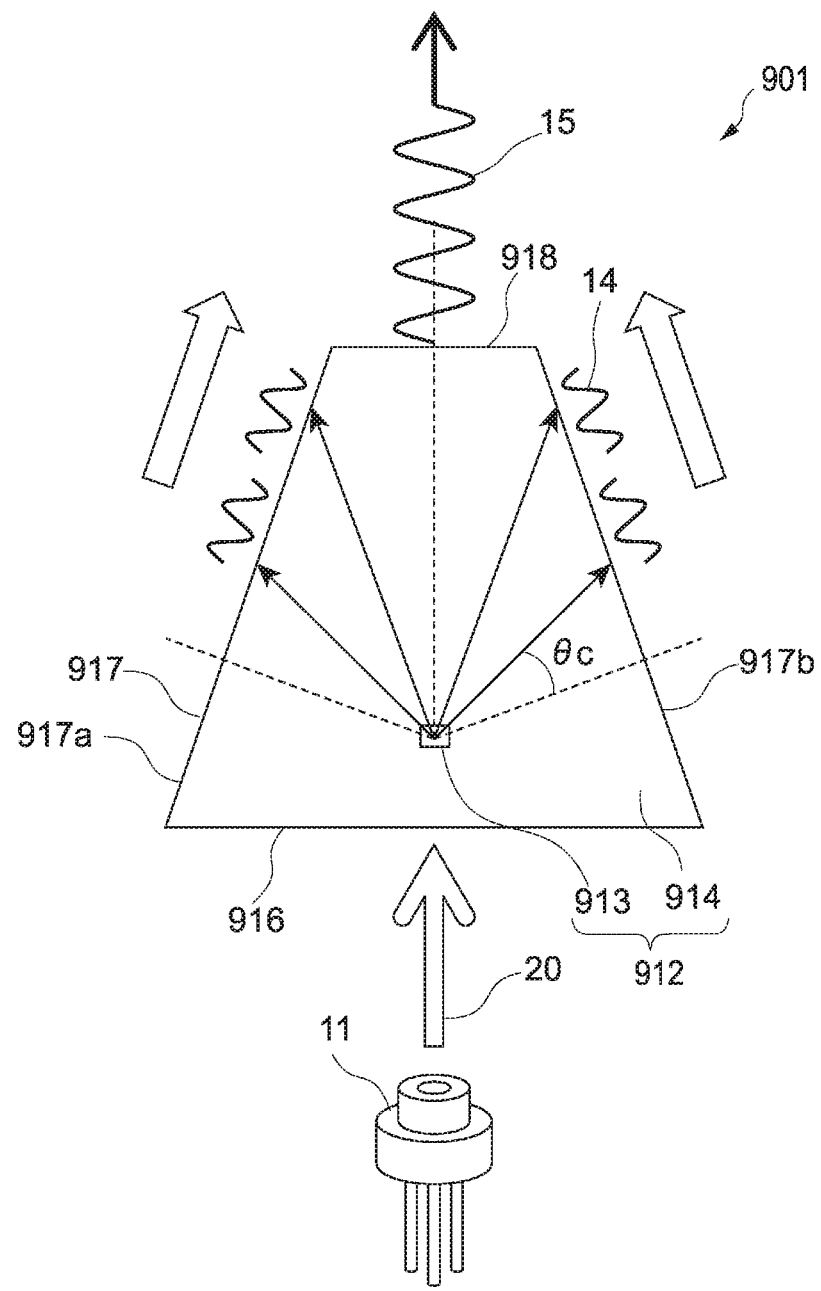
FIG. 10 is a schematic view of a solid light source according to a tenth embodiment.

FIG. 10 is a schematic view of a solid light source 901 according to a tenth embodiment.

The solid light source 901 has a laser light source 11 that is an excitation light source and a fluorescent molded body 912. The fluorescent molded body 912 has a truncated square pyramid shape. The fluorescent molded body 912 includes a phosphor fine particle compound 913 serving as a phosphor layer inside a transparent high refractive index body 914. The transparent high refractive index body 914 is made of a transparent high refractive index material such as GaAs. The transparent high refractive index body 914 has the same shape as that of, for example, the fluorescent molded body 12 of the first embodiment. The fluorescent molded body 912 includes the phosphor fine particle compound 913 at a position corresponding to the position of the light emission point 13 of the fluorescent molded body 12.

The phosphor fine particle compound 913 is a phosphor layer in which phosphor fine particles are contained in an organic resin. For example, the phosphor fine particle compound 913 can be formed by making a dimethyl silicone resin solution serving as an organic resin solution contain fine particles of $BaMgAl_{10}O_{17}$:$Eu^{2+}$ (BAM) that represent phosphor fine particles. Further, the laser light source 11 can be, for example, an InGaN bluish violet laser that excites $BaMgAl_{10}O_{17}$:$Eu^{2+}$ (BAM). Thus, blue light is emitted from the solid light source 901.

The fluorescent molded body 912 has a truncated square pyramid shape having a first flat surface 916 on which laser light 20 output from the laser light source 11 is incident, a second flat surface 918 parallel to the first flat surface 916, and a lateral surface 917 in contact with the first flat surface 916 and the second flat surface 918. The lateral surface 917 has a pair of a first inclined surface 917a and a second inclined surface 917b inclined at a blunt angle with respect to the second flat surface 918 and arranged facing each other.

In the fluorescent molded body 912, evanescent waves 14 respectively ooze into the paired first inclined surface 917a and second inclined surface 917b like the above fluorescent molded bodies made of the bulk phosphors. The evanescent waves 14 move toward the second flat surface 918 along the first inclined surface 917a and the second inclined surface 917b. When reaching the second flat surface 918, the evanescent waves 14 are coupled together to be converted into propagation light 15 and emitted from the solid light source 901. Therefore, light extraction efficiency is good.

Even with the fluorescent molded body 912 of the present embodiment in which the phosphor fine particle compound 913 is arranged inside the transparent high refractive index body 914 made of a high refractive index material such as GaAs, light emission having high directivity can be obtained provided that the conditions for making use of the coupling phenomenon of the evanescent waves described in the first embodiment are satisfied.

Eleventh Embodiment

The above respective embodiments describe examples in which the fluorescent molded bodies have the first surface and the second surface parallel to each other. However, the first surface and the second surface may not be parallel to each other, and high-brightness light emission having high directivity that makes use of the coupling phenomenon of evanescent light like the above respective embodiments can be obtained.

Hereinafter, a fluorescent molded body will be described with reference to FIG. 11. The same configurations as those of the above embodiments will be denoted by the same reference signs.

Figure 11:
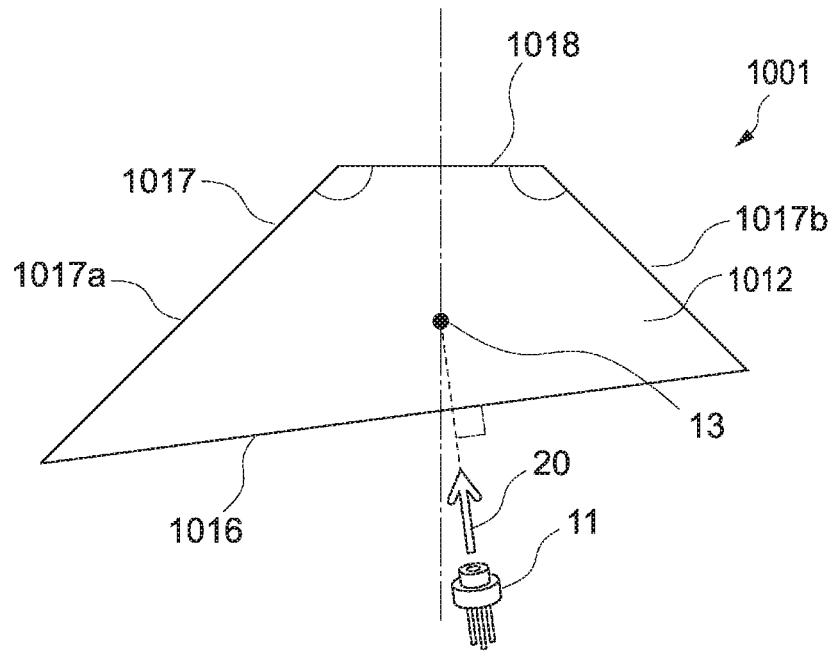
FIG. 11 is a schematic view of a solid light source according to an eleventh embodiment.

FIG. 11 is a schematic view of a solid light source 1001 according to an eleventh embodiment.

The solid light source 1001 has a laser light source 11 that is an excitation light source and a fluorescent molded body 1012. The fluorescent molded body 1012 has a hexahedron shape. The fluorescent molded body 1012 has a first flat surface 1016, a second flat surface 1018, and a lateral surface 1017.

Laser light 20 output from the laser light source 11 is incident on the first flat surface 1016.

The first flat surface 1016 and the second flat surface 1018 are arranged facing each other. The second flat surface 1018 has an area smaller than that of the first flat surface 1016.

The lateral surface 1017 is in contact with the first flat surface 106 and the second flat surface 1018. The lateral surface 1017 has a pair of a first inclined surface 1017a and a second inclined surface 1017b inclined at a blunt angle with respect to the second flat surface 1018 and arranged facing each other. Since the fluorescent molded body 1012 has a hexahedron shape in the present embodiment, two sets of the first inclined surfaces 1017a and the second inclined surfaces 1017b arranged facing each other exist. Further, both an angle formed between the first inclined surface 1017a and the second flat surface 1018 and an angle formed between the second inclined surface 1017b and the second flat surface 1018 are blunt angles and configured to be equal to each other.

In the present embodiment, the first flat surface 1016 and the second flat surface 1018 are not parallel to each other. In this case, the laser light source 11 only has to be arranged so that the laser light is perpendicularly incident on the first surface 1016 and reaches a light emission point 13. Note that the light emission point 13 is provided on a line passing through the center of the second surface 1018 and perpendicular to the second surface.

The first flat surface 1016 and the second flat surface 1018 are arranged to be not parallel to each other as described above, whereby the design range of the laser light source 11 can be widened. That is, the adjustment of an arrangement angle of the first flat surface 1016 with respect to the second flat surface 1018 can achieve the arrangement of the laser light source 11 at any position such as the oblique arrangement of the laser light source 11, which increases the degree of flexibility in design.

Twelfth Embodiment

Figure 12:
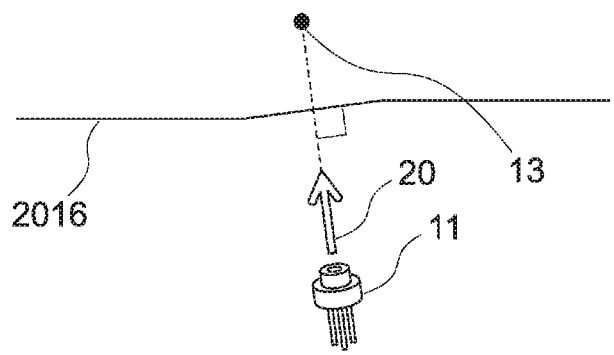
FIG. 12 is a schematic partial enlarged view of a solid light source according to a twelfth embodiment.

The above respective first to seventh, the tenth, and the eleventh embodiments describe examples in which the first surface of the fluorescent molded body on the side on which the laser light that is excitation light is applied is a flat surface. The first surface is desirably flat but is not necessarily flat. Even if a first surface 2016 has a plurality of inclined surfaces as shown in, for example, FIG. 12, high-brightness light emission having high directivity that makes use of the coupling phenomenon of evanescent light like the above respective embodiments can be obtained. When the first surface 2016 is not a flat surface as described above, a laser light source 11 only has to be arranged so that laser light 20 is perpendicularly incident on the first surface 2016 and reaches a light emission point 13.

The respective embodiments of the present technology are described above. However, the present technology is not limited to the above embodiments and can be modified in various ways without departing from its spirit.

For example, in the above embodiments, one fluorescent molded body or a plurality of fluorescent molded bodies is provided with respect to one laser light. However, excitation light from a plurality of lasers may be condensed into one fluorescent molded body, whereby laser light intensity can be increased. Further, using a plurality of different laser light sources, a laser light source that outputs excitation light suitable for a fluorescent molded body may be provided for each of fluorescent molded bodies having different light emission colors.

Note that the present technology can also employ the following configurations.

(1) A fluorescent molded body including:
a first surface on which excitation light output from a laser light source is incident;
a second surface arranged facing the first surface; and
a lateral surface that is in contact with the first surface and the second surface and has a first inclined surface and a second inclined surface inclined at a blunt angle with respect to the second surface and arranged facing each other, in which
the fluorescent molded body emits light when excited by the excitation light, and
a distance between a position at which the first inclined surface and the second surface are in contact with each other and a position at which the second inclined surface and the second surface are in contact with each other is less than $2\lambda$ when a light emission wavelength of the emitted light is expressed as $\lambda$.

(2) The fluorescent molded body according to (1), in which
evanescent waves are generated at the first inclined surface and the second inclined surface when the light emitted due to the fluorescent molded body being excited by the excitation light is totally reflected inside the fluorescent molded body.

(3) The fluorescent molded body according to (1) or (2), in which
an angle formed between the first inclined surface and the second surface and an angle formed between the second inclined surface and the second surface are equal to each other.

(4) The fluorescent molded body according to any of (1) to (3), in which
the second surface is a flat surface.

(5) The fluorescent molded body according to (4), in which the first surface is a flat surface.

(6) The fluorescent molded body according to any of (1) to (5), in which
the fluorescent molded body has a frustum shape.

(7) The fluorescent molded body according to any of (1) to (6), in which
the fluorescent molded body is made of a bulk phosphor.

(8) The fluorescent molded body according to any of (1) to (6), in which
the fluorescent molded body has a transparent high refractive index body and a phosphor layer that is arranged inside the transparent high refractive index body and contains phosphor fine particles that emit light when excited by the excitation light.

(9) A solid light source including:
a laser light source that outputs excitation light; and
a fluorescent molded body having a first surface on which the excitation light is incident, a second surface arranged facing the first surface, and a lateral surface that is in contact with the first surface and the second surface and has a first inclined surface and a second inclined surface inclined at a blunt angle with respect to the second surface and arranged facing each other, in which
the fluorescent molded body emits light when excited by the excitation light, and
a distance between a position at which the first inclined surface and the second surface are in contact with each other and a position at which the second inclined surface and the second surface are in contact with each other is less than $2\lambda$ when a light emission wavelength of the emitted light is expressed as $\lambda$.

(10) An electronic apparatus including:
a laser light source that outputs excitation light; and
a fluorescent molded body having a first surface on which the excitation light is incident, a second surface arranged facing the first surface, and a lateral surface that is in contact with the first surface and the second surface and has a first inclined surface and a second inclined surface inclined at a blunt angle with respect to the second surface and arranged facing each other, in which
the fluorescent molded body emits light when excited by the excitation light, and
a distance between a position at which the first inclined surface and the second surface are in contact with each other and a position at which the second inclined surface and the second surface are in contact with each other is less than $2\lambda$ when a light emission wavelength of the emitted light is expressed as $\lambda$.

(11) The electronic apparatus according to (10), further including:
a rotation substrate having a plurality of the fluorescent molded bodies arranged thereon and causing the excitation light to pass therethrough.

REFERENCE SIGNS LIST 1, 101, 201, 301, 501, 601, 901, 1001 solid light source laser light source
12, 112, 212, 412, 712, 912, 1012 fluorescent molded body
14 evanescent wave
16, 116, 216, 1016 first flat surface (first surface)
17, 117, 217, 717, 917, 1017 lateral surface
17a, 117a, 217a, 717a, 917a, 1017a first inclined surface
17b, 117b, 217b, 717b, 917b, 1017b second inclined surface
18, 118, 218, 1018 second flat surface (second surface)
20 laser light (excitation light)
308 rotation substrate
716 first surface
913 phosphor fine particle compound (phosphor layer)
914 transparent high refractive index body
1000 projector (electronic apparatus)
2016 first surface

The invention claimed is:
1. A fluorescent molded body, comprising:
a first surface configured to receive excitation light outputted from a laser light source;
a plurality of protrusions evenly arranged on the first surface;
a second surface that faces the first surface;
a phosphor layer that includes phosphor particles, wherein the phosphor layer is between the first surface and the second surface, and the phosphor layer is on a line orthogonal to a center of the second surface; and a first inclined lateral surface and a second inclined lateral surface, wherein each of the first inclined lateral surface and the second inclined lateral surface extends between the first surface and the second surface, each of the first inclined lateral surface and the second inclined lateral surface is inclined at a blunt angle with respect to the second surface, the phosphor particles emit a specific light based on excitation of the phosphor particles by the excitation light, a light emission wavelength of the emitted specific light is $\lambda$, and a distance between a position at which the first inclined lateral surface is in contact with the second surface and a position at which the second inclined lateral surface is in contact with the second surface is less than $2\lambda$.

2. The fluorescent molded body according to claim 1, wherein a distance between a position of the phosphor layer and the center of the second surface is between 0.25 μm and 1 μm.

3. The fluorescent molded body according to claim 1, wherein
the fluorescent molded body is configured to generate evanescent waves at the first inclined lateral surface and the second inclined lateral surface based on total internal reflection of the emitted specific light inside the fluorescent molded body.

4. The fluorescent molded body according to claim 3, wherein
an angle between the first inclined lateral surface and the second surface is equal to an angle between the second inclined lateral surface and the second surface.

5. The fluorescent molded body according to claim 4, wherein
the second surface is a flat surface.

6. The fluorescent molded body according to claim 5, wherein
the fluorescent molded body further includes a bulk phosphor.

7. The fluorescent molded body according to claim 5, wherein
the fluorescent molded body further includes a transparent high refractive index body, and
the phosphor layer is inside the transparent high refractive index body.

8. The fluorescent molded body according to claim 5, wherein
the first surface is a flat surface.

9. The fluorescent molded body according to claim 8, wherein
the fluorescent molded body has a frustum shape.

10. A solid light source, comprising:
a laser light source configured to output excitation light; and
a fluorescent molded body that includes:
a first surface configured to receive the excitation light,
a plurality of protrusions evenly arranged on the first surface,
a second surface that faces the first surface,
a phosphor layer that includes phosphor particles, wherein the phosphor layer is between the first surface and the second surface, and the phosphor layer is on a line orthogonal to a center of the second surface, and
a first inclined lateral surface and a second inclined lateral surface,
wherein each of the first inclined lateral surface and the second inclined lateral surface extends between the first surface and the second surface,
each of the first inclined lateral surface and the second inclined lateral surface is inclined at a blunt angle with respect to the second surface,
the phosphor particles emit a specific light based on excitation of the phosphor particles by the excitation light,
a light emission wavelength of the emitted specific light is $\lambda$, and
a distance between a position at which the first inclined lateral surface is in contact with the second surface and a position at which the second inclined lateral surface is in contact with the second surface is less than $2\lambda$.

11. An electronic apparatus, comprising:
a laser light source configured to output excitation light; and
a fluorescent molded body that includes:
a first surface configured to receive the excitation light,
a plurality of protrusions evenly arranged on the first surface,
a second surface that faces the first surface,
a phosphor layer that includes phosphor particles, wherein the phosphor layer is between the first surface and the second surface, and the phosphor layer is on a line orthogonal to a center of the second surface, and
a first inclined lateral surface and a second inclined lateral surface,
wherein each of the first inclined lateral surface and the second inclined lateral surface extends between the first surface and the second surface,
each of the first inclined lateral surface and the second inclined lateral surface is inclined at a blunt angle with respect to the second surface,
the phosphor particles emit a specific light based on excitation of the phosphor particles by the excitation light,
a light emission wavelength of the emitted specific light is $\lambda$, and
a distance between a position at which the first inclined lateral surface is in contact with the second surface and a position at which the second inclined lateral surface is in contact with the second surface is less than $2\lambda$.

12. The electronic apparatus according to claim 11, further comprising a rotation substrate that includes a plurality of fluorescent molded bodies, wherein the rotation substrate is configured to cause the excitation light to pass therethrough.

* * * * *